United States Patent Office 2,737,536
Patented Mar. 6, 1956

2,737,536

METHOD OF SYNTHESIZING TERT-ALKYL SUBSTITUTED AROMATIC COMPOUNDS

Herman S. Bloch, Chicago, and George L. Hervert, Downers Grove, Ill., assignors to Universal Oil Products Company, Des Plaines, Ill., a corporation of Delaware No Drawing. Application December 31, 1952, Serial No. 329,122

11 Claims. (Cl. 260—671)

This invention relates to a process for the manufacture of aromatic compounds having a tert-alkyl nuclear substituent. More specifically, the invention concerns a process for reacting an aromatic hydrocarbon having a nuclearly replaceable hydrogen atom with an isoparaffinic hydrocarbon to form a nuclearly tert-alkyl substituted aromatic hydrocarbon, the tert-alkyl group being derived from the isoparaffin charging stocks as a result of hydrogen transfer between olefinic and paraffinic hydrocarbon feed stocks in the presence of an acidic alkylation catalyst.

In accordance with one of its embodiments the present invention relates to a process for the production of a tert-alkyl-substituted aromatic compound which comprises reacting an aromatic compound containing a nuclearly replaceable hydrogen atom with a paraffinic hydrocarbon having in its structure a tertiary carbon atom, said reaction being effected in the presence of an olefinic hydrocarbon and an acidic alkylation catalyst capable of effecting hydrogen transfer between the paraffinic and olefinic hydrocarbon reactants.

A more specific embodiment of the invention concerns an alkylation process for the production of tert-amylbenzene which comprises reacting benzene with isopentane in the presence of dodecylene and an alkylation catalyst comprising concentrated sulfuric acid, utilizing not over 1 molar proportion of dodecylene per mole of isopentane, said process being effected at alkylation and hydrogen transfer reaction conditions.

Many special aromatic organic compounds useful for particular purposes require the presence of a tert-alkyl substitutent on the aryl nucleus to be effective or to exhibit optimum activity for the particular purpose to which the aromatic compound is put. Thus, for example, alkyl phenols, alkylaryl amines, alkylaryl aminophenols and many other types of aromatic compounds are used as food oxidation inhibitors and food preservatives and the maximum effectiveness of these compounds for their intended purpose are realized when one or more of the alkyl substitutents on the aromatic ring is a tert-alkyl group. In the paper entitled "Alkyl phenols as anti-oxidants" by R. H. Rosenwald et al., Industrial Engineering Chemistry 42, page 162, the results of comparative tests of a series of alkyl phenols is reported. These tests establish the fact that the tert-alkyl-substituted phenols were significantly more effective as food oxidation inhibitors than the normal and secondary alkyl phenols of corresponding structure. Numerous similar observations have shown that the tert-alkyl-substituted aromatic compounds, as contrasted to the corresponding normal- and secondary-alkyl-substituted analogs are substantially more effective than the latter derivatives in which the alkyl groups are the only distinguishing structural difference. The present invention provides a means for preparing tert-alkyl-substituted aromatic compounds and is a particularly convenient means for the preparation of such products where the compounds are not available from natural sources or are difficult to prepare by standard methods of synthesis. In many instances, for example, the tert-alkyl-substituted aromatic compound cannot be conveniently prepared simply by direct alkylation of the aromatic compound utilized as the starting material with an olefin to provide a product in which the aryl nucleus is directly attached to a tertiary carbon atom. The latter is particularly true, for example, when a suitable olefinic alkylating agent having the requisite tertiary structure is unavailable or is too difficult or too expensive to prepare, and when the corresponding isoparaffin is available, as is frequently the case by virtue of the greater availability of paraffins of different structures from natural sources than the corresponding olefins which generally do not occur naturally.

Thus, when utilizing a tertiary olefin as the alkylating agent in a condensation reaction between the aromatic compound and the tertiary olefin, the product usually comprises a mixture of various isomers of the desired alkyl aromatic compound and in some instances the alkylation does not yield an alkylate product in which the alkyl group is attached to the aromatic nucleus through the tertiary carbon atom of the olefinic hydrocarbon alkylating agent. By means of the present process, the tertiary olefin is formed during the reaction in situ via a hydrogen transfer reaction between the olefinic hydrocarbon charging stock and the isoparaffin reactant; in consequence, a major proportion of the product consists of the tert-alkyl-substituted aromatic compound having an alkyl group which is attached to the aromatic ring at the tertiary carbon atom of the isoparaffin reactant. It has been found that hydrogen transfer occurs between the paraffinic and the olefinic hydrocarbon reactants at the alkylating conditions maintained in the reaction mixture, and as a consequence of the presence of the acidic alkylation catalyst in the reaction mixture. The products of the present invention are useful for all processes for which tert-alkyl-substituted aromatic compounds may be employed. Thus, for example, the effectiveness of many alkylphenol and alkylaryl amine oxidation inhibitors depends upon the character of the alkyl substituent on the aromatic ring and in many cases, the tert-alkyl-substituted phenol and aryl amines are substantially more effective than their corresponding normal and secondary alkyl-substituted analogs. It is known that the physical properties and detergent qualities of alkylaryl sulfonates also vary considerably as the structure of the alkyl substituent attached to the nucleus is varied, the alkylaryl sulfonates in which one of the alkyl substituents is a tertiary alkyl group generally having a lower melting point and in some cases greater solubility in water than the secondary and normal alkylaryl sulfonates having an alkyl group containing the same number of carbon atoms per group as the tertiary alkyl group. Similarly, tert-alkylphenols are advantageously used in the preparation of oil-soluble phenol-formaldehyde resins, the t-alkyl (e. g. t-butyl or t-amyl) group imparting enhanced solubility characteristics and color stability as compared with normal or secondary alkyl substituents. The present invention provides a convenient means of producing such select compounds where the latter are particularly preferred for a given purpose.

The aromatic compound subjected to alkylation in the present process is herein characterized as an aromatic compound containing a nuclearly replaceable hydrogen atom, that is, a hydrogen atom which can be replaced by a tert-alkyl group during the alkylation and in the presence of an acidic alkylation catalyst. In general, it is preferred that the aromatic reactant contain not more than three nuclear substituents such that the tert-alkyl group which enters the aromatic nucleus during the alkylation reaction is not prevented from becoming attached to a nuclear position as a result of steric hindrance or other interference from nuclear substituents already present on the aromatic ring. The process of this invention may be utilized as one step in the preparation of the tert-alkyl-substituted derivatives of various aromatic compounds such as the mono-, di-, and tri-hydroxy phenols, including phenol itself, as well as the polycyclic naphthols and mono- and dihydroxy-substituted phenanthrene derivatives etc.; the mono-, and polyamino substituted benzenes, naphthalenes, phenanthrenes, etc.; the mono- and polynitro substituted aromatic hydrocarbons; the mono-, and polycarboxyl, sulfo, cyano, and alkyl derivatives of both the mono-nuclear and polynuclear aromatic hydrocarbon series, as well as the aromatic compounds containing mixed nuclear substituents, such as hydroxybenzoic acid, the aminophenols, etc. A particularly preferred series of compounds utilizable as the aromatic reactant in the present alkylation process are the lower mono- and dialkyl substituted benzene and naphthalene hydrocarbons, that is the hydrocarbons of the above types in which the alkyl substituents are short chain alkyl radicals, such as methyl, ethyl, n-propyl and isopropyl. Typical representative aromatic compounds utilizable as the starting material of the present process which contain the requisite nuclearly replaceable hydrogen atoms are such compounds as phenol, hydroquinone, resorcinol, pyrogallol, phloroglucinol, catechol, alpha- and beta-naphthols, benzoic acid, mono-chloro-, monobromobenzene, the dihalogen substituted benzenes and naphthalenes, such as o-dichlorobenzene; thiophene; the aromatic alcohols, such as, benzyl alcohol; aromatic compounds containing various nuclear substituents such as phenylnitrile, benzene, toluene, ethylbenzene, ethyltoluene, cumene and a host of other compounds containing one or more nuclear substituents.

It is to be noted that the aromatic compound utilized as the alkyl acceptor reactant in the present alkylation reaction must contain a replaceable nuclear hydrogen atom as an essential structural characteristic thereof, the nuclear hydrogen atom being replaced during the alkylation reaction with the tertiary alkyl group derived from the alkylating agent containing a tertiary carbon atom. The aromatic reactant, however, may contain one or more, but preferably not more than three other nuclear radicals such as the aforementioned hydroxyl, halo, nitro, carboxyl, etc., provided that the number of other such additional radicals does not hinder the attachment of the tertiary alkyl group involved in the alkylation process.

The alkylating agent which is the source of the tertiary alkyl group actually involved in the present alkyl transfer reaction is derived from an isoparaffinic hydrocarbon or a cycloparaffin containing a tertiary carbon atom which loses hydrogen during the alkylation reaction via hydrogen transfer with an olefinic hydrocarbon present in the reaction mixture, the hydrogen transfer presumably resulting in the formation of an intermediate olefinic hydrocarbon containing an unsaturated linkage on the tertiary carbon atom. The reaction which is believed to be involved in the present alkylation process is shown in the following equation:

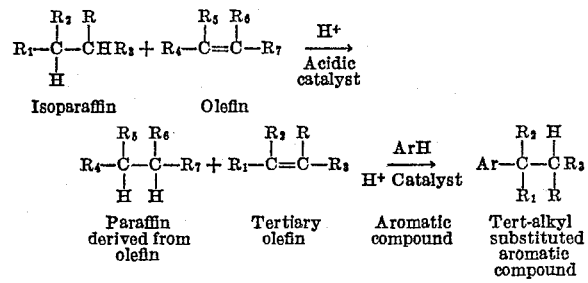

wherein $R_1$ and $R_2$ represent hydrocarbon radicals, R and $R_3$ may each be hydrogen or a hydrocarbon radical, and $R_4$, $R_5$, $R_6$, and $R_7$ may likewise be independently selected from the class comprising hydrogen and hydrocarbon radicals; H+ represents an acidic type alkylation catalyst; and ArH is the aromatic alkyl-acceptor hereinbefore described. Suitable isoparaffinic hydrocarbon alkylating agents containing a tertiary carbon atom in their structure include such compounds as isobutane, isopentane (2-methylbutane), 2- or 3-methylpentane, 2,3-dimethylbutane, the methylhexanes and dimethylpentanes which contain tert-carbon atoms, 2,2,3-trimethylbutane, the methylheptanes, certain dimethylhexanes, and trimethylpentanes including 2,2,3-trimethylpentane, 2-methyl-3-ethylpentane, methylcyclopentane, methylcyclohexane, dimethylcyclohexane, and homologs of the above containing up to about 15 carbon atoms per molecule, including the branched chain undecanes, decanes, dodecanes, tridecanes, and the mono-, di-, and tri-alkyl-substituted cycloparaffins of the cyclopentane, cyclohexane, and cycloheptane series. These isoparaffins which contain tertiary carbon atoms undergo dehydrogenation during the hydrogen transfer reaction to yield the corresponding olefins having an olefinic double bond on the tertiary carbon atom, such that during the subsequent alkylation or condensation reaction with the aromatic reactant, the alkylating agent becomes attached to the aromatic nucleus at the tertiary carbon atom (the carbon atom containing least hydrogen) and forms a tert-alkyl-substituted derivative of the aromatic reactant. The hydrogen transfer from the isoparaffinic alkylating agent saturates the double bond of the olefinic reactant to form a paraffin corresponding in structure to the olefinic hydrocarbon involved in the hydrogen transfer reaction.

The olefinic hydrocarbon component of the present reaction mixture is characterized merely as an olefinic hydrocarbon capable of acting as a hydrogen acceptor in the hydrogen transfer reaction in the presence of an acidic alkylation catalyst of the type herein provided. The most effective olefins are those which by virtue of their greater chain length or particular structure have lowered reactivity and hence do not alkylate aromatics as readily as other olefins. The present process involves a consideration of the relative alkylating activities of the olefinic hydrocarbon initially charged to the reaction mixture with the olefin formed by dehydrogenation of the isoparaffinic hydrocarbon reactant and it becomes a primary factor in the process to select an olefinic reactant which undergoes the hydrogen exchange reaction more readily than the alkylation reaction, the preferred olefins for this purpose being those which differ substantially in molecular weight from the olefin produced in situ by the dehydrogenation of the isoparaffin reactant, preferably olefins of substantially greater molecular weight such as those containing from 3 to 8 more carbon atoms than the isoparaffinic hydrocarbon reactant. Typical olefinic hydrocarbons suitable for this purpose include olefins such as ethylene, propylene, n-butylene (including butene-1 as well as butene-2), n-amylene, n-hexene, n-heptene, n-octene, and particularly the olefinic hydrocarbons of higher molecular weight than normal heptene, such as n-decene, n-dodecene and others containing up to about 20 carbon atoms per molecule. Also included in the above group of olefins utilizable as reactants in the hydrogen transfer reaction are the cyclo-olefins such as cyclohexene, cycloheptene, and others of higher molecular weight. The relatively high molecular weight olefins are preferred in the present process, particularly when an isoparaffin of shorter chain length is involved in the alkylation reaction, because of the relatively greater ease of alkylation of the olefins formed by dehydrogenation of such isoparaffins. The reactants should be chosen, however, so that there is no great difficulty in separating the alkylate product from the paraffin formed from the olefinic hydrocarbon by virtue of the hydrogen transfer reaction.

Catalysts utilizable in the alkylation reaction and which also catalyze the hydrogen transfer reaction between isoparaffin and olefinic hydrocarbon reactants in the presence of an aromatic compound charged to the process are characterized as acid-acting inorganic compounds capable of effecting the required hydrogen and alkyl transfer reactions involved in the process. Acid-acting inorganic compounds having alkylating activity include certain mineral acids, such as sulfuric acid containing not more than 10% by weight of water and preferably less than 5% by weight of water, including sulfuric acid catalysts recovered from the alkylation of isoparaffins with olefins, hydrofluoric acid of at least 90% concentration and containing less than 10% by weight of water, liquefied anhydrous hydrogen fluoride, anhydrous aluminum chloride or aluminum bromide, boron trifluoride, preferably utilized in admixture with concentrated hydrofluoric acid, and other acid-acting catalysts, particularly of the Friedel-Crafts class of metallic halides. The catalyst particularly preferred for the present alkylation-hydrogen transfer reaction is hydrogen fluoride containing at least 95% and preferably 98% hydrogen fluoride. A portion of the acidic catalyst charged to the reaction zone may comprise recycled spent catalyst from a previous alkylation reaction which may be combined with fresh acidic catalyst and the mixture charged to the reaction zone.

The hydrogen transfer and alkylation reactions of the present process occur in the reaction zone in contact with the acidic alkylation catalyst as a unit process, although it is believed that the hydrogen transfer reaction occurs prior to the condensation of the feed stock olefin or the olefin resulting from the hydrogen transfer reaction, the latter reaction occurring at a much faster rate than the condensation reaction of the resulting olefin with the aromatic compound. The combination hydrogen transfer-alkylation reaction occurs at temperatures of from about −25° to about 150° C. (depending on the particular catalyst employed and other operating conditions) and in a preferred method of operating the process, the reaction zone is maintained at temperatures of from about 0° to about 50° C. The pressure maintained within the reactor is desirably sufficient to substantially liquefy both the catalyst and hydrocarbon reactants. When the desired product is the mono-alkylate, resulting from the condensation of one mole of the aromatic compound with one mole of the olefinic hydrocarbon formed by hydrogen transfer from the isoparaffin reactant, a molar excess of the aromatic compound is charged into the reaction zone, the molar ratio being based upon the quantity of the mono-olefin reactant charged. Generally, ratios of from about 2 to 1 to about 10 to 1 or higher mols of aromatic compound per mol of olefinic hydrocarbon are utilized in the reaction. Since the reaction mechanism involved in the present process involves the transfer of hydrogen from the isoparaffin to the mono-olefin, and since each molar proportion of mono-olefin is capable of generating a stoichiometric proportion of olefin from the isoparaffin hydrocarbon, the molar ratio of isoparaffin to mono-olefin charged into the reaction is preferably maintained at 1 to 1 or greater, up to about 10:1. It is generally preferred to charge the isoparaffin and mono-olefinic hydrocarbon reactants into the reaction zone as a mixture in order to obtain the required hydrogen transfer between these reactants prior to the condensation of the generated olefin with the aromatic reactant. The acid-acting catalyst is charged to the reaction in amounts of from about 0.1 to about 5 to 1 volume proportions of catalyst per volume of hydrocarbon, depending upon the type of catalyst employed in the reaction and its catalytic activity. The mixture of catalyst and reactants may be thoroughly stirred or otherwise intimately contacted during the course of the reaction which usually proceeds for a period of from about 0.2 to about 2 hours. Following completion of the reaction, the mixture is allowed to settle in order to separate a resulting used catalyst phase from the aromatic alkylate and unconverted reactants, if any. When utilizing a reaction mixture in which the ratio of aromatic compound to olefin is relatively low, some of the alkylate product may consist of dialkyl-substituted aromatic compounds, and the latter may generally be separated from the mono-alkylate by simple or fractional distillation.

The present invention is further illustrated with respect to certain specific embodiments thereof in the following examples, which, however, are not intended to limit the broad scope of the invention in strict accordance therewith.

In the following series of experiments benzene was subjected to alkylation in the presence of a sulfuric acid catalyst containing 91.9% titratable acid (titratable as sulfuric acid) and 1.4% by weight of water, comprising spent isoparaffin alkylation acid (recovered from an iso-butane-butylene alkylation unit), fortified with 25% oleum to the above concentration of sulfuric acid. In the series of alkylation reactions indicated below, various isoparaffin hydrocarbons were utilized as alkylating agents, including isopentane, methylcyclopentane and methylcyclohexane; the products of these reactions were compared in composition with the products obtained in an alkylation reaction in which no paraffinic hydrocarbon was present and also with the product in which n-heptane (containing no tertiary carbon atom) was charged to the reaction. Each of the comparative runs was conducted under as closely analogous conditions as possible in order to clearly define the difference in results as a factor influencing the reaction.

In each of the following runs the olefinic charging stock was a propylenepolymer fraction (tetramer) boiling from 170–225° C., and was made up mainly of branched chain tertiary olefins. The benzene consisted of thiophene-free, 100% benzene. In the experiment utilizing isopentane as the paraffinic hydrocarbon portion of the charging stock, the isopentane was 99% pure, the remainder being normal pentane. In the experiment utilizing methylcyclopentane as the paraffinic hydrocarbon portion of the charging stock, the fraction consisted of 82.3% methylcyclopentane, 6.8% benzene, 1.5% cyclohexane and 9.4% normal hexane. In the experiment utilizing methylcyclohexane as the paraffinic hydrocarbon portion of the feed stock, the material utilized was prepared by hydrogenation of pure toluene and consisted of 99+% methylcyclohexane. Each of the alkylation experiments was conducted in an improved type of alkylation apparatus utilizing a procedure which results in maximum yields of alkylate from the system. The benzene feed was mixed with the propylene tetramer fraction and the paraffinic hydrocarbon (where utilized) to provide a hydrocarbon mixture in which the benzene to propylene tetramer mol ratio was maintained at a value of 10. The sulfuric acid alkylation catalyst consisted of the sulfuric acid described above (mixed with recycle acid), the mixture being charged into the reaction at the rate of 1.25 pounds per pound of olefinic tetramer charging stock. The total hydrocarbon to total acid volume ratio maintained throughout the experiment was 3 to 1. The hydrocarbon feed stock and sulfuric acid alkylation catalyst were each precooled to 0° C. and mixed in a centrifugal pump which discharged the resulting mixture into a time tank alkylation unit consisting of a vertical tube containing orifice plates spaced at five inch intervals throughout the length of the tube, thereby insuring complete mixing of the hydrocarbon and acid phases during the residence of the hydrocarbon and acid mixture in the time tank, the mixture forming an emulsion of acid and hydrocarbons at is flowed through the centrifugal pump and orifice plates. A major portion of the acid-hydrocarbon mixture was continuously recirculated in the unit by removal of the acid-hydrocarbon emulsion from the bottom of the time tank, cooling the removed portion to 0° C. and thereafter recharging the same into the top of the time tank (vertical tube) after blending into the stream the hydrocarbon feed stock and the mixture of recycle and fresh makeup acid, each of the latter streams being supplied to the centrifugal pump as a mixture at 0° C. A side-stream equal in volume to the total volume of fresh make-up acid and the total volume of fresh hydrocarbon feed stock charged to the reaction was removed from the center of the vertical time tank and discharged into a settling receiver immersed in a cooling bath maintained at 0° C., the acid and hydrocarbon phases separating on standing into an upper hydrocarbon layer and a lower recycle acid layer. The acid phase was continuously removed from the settling receiver and utilized as recycle acid as hereinbefore described. The upper hydrocarbon phase from the settling receiver was continuously removed at the same rate as it was produced in the alkylation unit, washed with water to remove small amounts of dissolved and entrained sulfuric acid alkylation catalyst and thereafter fractionally distilled to recover alkylate product from unreacted portions of the hydrocarbon feed stocks. The operation of the unit as indicated resulted in the circulation of the total hydrocarbon and acid emulsion at the rate of approximately 105 gal./hr., and resulted in recirculation of the total contents of the alkylation unit 631 times every hour. All streams into the alkylation unit were continuously maintained at a temperature of 0° C. by maintaining a cooling bath at this temperature around the time tank, each of the hydrocarbon and acid reservoirs, the product receiver vessel and the lines connecting each of the individual units of the apparatus. At the indicated rate of recirculation of the total acid and hydrocarbons, the hydrocarbons were in contact with the acid for a total time of approximately 42 minutes.

Distillation of the hydrocarbon product separated from the alkylation reaction mixture in the receiver vessel resulted in the following yields of individual products, the boiling points of the fractions depending upon the type of paraffin utilized in the alkylation experiment. In each case, a $C_5$, $C_6$ or $C_7$ distillate fraction was collected as the unreacted benzene and/or paraffin or cycloparaffin utilized in the process. A higher boiling fraction containing dodecanes formed by hydrogen transfer between propylene tetramer and the isoparaffinic reactants was separated and the unreacted dodecylenes removed therefrom by adsorption on silica gel by a chromatographic separation method. The purity of the resulting fractions was confirmed by infra-red and ultra-violet spectrographic analysis. A higher boiling fraction comprising the $C_5$ and $C_6$ mono-alkylates of benzene was separated, followed by a fraction comprising the mono-dodecyl benzene alkylates, the di-$C_5$ and $C_6$ alkylates and the mono-$C_5$ or $C_6$ alkylates of dodecylbenzene, the latter compounds occurring as crystalline solids in the high boiling residue of the distillation pot in which the hydrocarbon product of the process was distilled. The following table indicates the yields of the various hydrocarbon products separated from the hydrocarbon phase of the alkylate mixture.

TABLE

*Alkylation of benzene in the presence of propylene tetramer (B. P.: 170–225° C.) and a paraffinic or cycloparaffinic hydrocarbon*

| Paraffin or Cycloparaffin [1] | Isopentane | Me-Cyclo-$C_5$ | Me-Cyclo-$C_6$ | n-Heptane | None |
|---|---|---|---|---|---|
| Yield, Total alkylate, lbs/lb. of olefin charged | 0.761 | 0.501 | 0.795 | 1.02 | 0.973 |
| Yield, Residual Olefin, mols/mol of olefin charged | 0.047 | 0.050 | 0.046 | 0.056 | 0.039 |
| Yield, Dodecane produced, mols/mol of olefin charged | 0.235 | 0.452 | 0.156 | 0.031 | 0.027 |
| Yield, $C_5$, $C_6$ or $C_7$ alkylate of benzene, (B. P. 170–275° C.) mols/mol of olefin charged | [2] 0.126 | [3] 0.125 | [4] 0.106 | [5] 0.023 | [4] 0.017 |
| Yield, $C_5$, $C_6$ or $C_7$ alkylate of dodecylbenzene, B. P. 325° C., mols/mol of olefin charged [6] | 0.012 | 0.049 | 0.017 | 0 | 0 |
| Yield, Dodecylbenzene, mols/mol of olefin charged (B.P. 275–325° C.) | 0.516 | 0.333 | 0.536 | 0.680 | 0.655 |

[1] Approximately 4 mols charged per mol of propylene tetramer.
[2] Comprising tert-amylbenzene.
[3] Comprising 1-methyl-1-phenylcyclopentane.
[4] Comprising 1-methyl-1-phenylcyclohexane.
[5] Contains alkylates of depolymerization products of propylene tetramer.
[6] Also includes di- and tri-alkylbenzenes.

We claim as our invention:

1. A process for the production of a tert-alkyl-substituted aromatic compound which comprises subjecting to alkylating conditions in the presence of an acidic alkylation catalyst a mixing of an aromatic compound containing a nuclearly replaceable hydrogen atom, a paraffinic hydrocarbon having in its structure a tertiary carbon atom, and an olefinic hydrocarbon containing at least 3 more carbon atoms per molecule than said paraffinic hydrocarbon, said aromatic compound being in molar excess of olefin in said mixture.

2. The process of claim 1 further characterized in that said olefinic hydrocarbon is a propylene tetramer fraction.

3. The process of claim 1 further characterized in that said reaction is effected at a temperature of from −25 to about 150° C.

4. The process of claim 1 further characterized in that said paraffinic hydrocarbon is an aliphatic isoparaffin.

5. The process of claim 4 further characterized in that said isoparaffin is isopentane.

6. The process of claim 1 further characterized in that said paraffinic hydrocarbon is an alkyl-substituted cycloparaffin.

7. The process of claim 6 further characterized in that said cycloparaffin is methylcyclopentane.

8. The process of claim 6 further characterized in that said cycloparaffin is methylcyclohexane.

9. The process of claim 1 further characterized in that said aromatic compound is an aromatic hydrocarbon containing not more than 3 nuclear substituent groups.

10. The process of claim 1 further characterized in that said paraffinic hydrocarbon is present in the reaction mixture in a molar excess over said olefinic hydrocarbon.

11. A process for the production of tert-amylbenzene which comprises subjecting a mixture of benzene, isopentane and dodecylene to alkylating conditions in the presence of sulfuric acid alkylation catalyst, said mixture containing at least 1 molar proportion of benzene and at least 1 molar proportion of isopentane per mol of dodecylene.

References Cited in the file of this patent

UNITED STATES PATENTS

| 2,419,692 | Shoemaker et al. | Apr. 29, 1947 |
| 2,626,966 | Kennedy et al. | Jan. 27, 1953 |

OTHER REFERENCES

Condon et al.: Journal Amer. Chem. Soc., vol 70 (July 1948), pages 2539–2542.